(12) United States Patent
Baldini

(10) Patent No.: US 8,578,895 B2
(45) Date of Patent: Nov. 12, 2013

(54) TWO-STROKE ENGINE WITH LOW CONSUMPTION AND LOW EMISSIONS

(75) Inventor: Piero Baldini, Pontedera (IT)

(73) Assignee: Primavis S.R.L., Turin (IT)

( * ) Notice: Subject to any disclaimer, the term of this patent is extended or adjusted under 35 U.S.C. 154(b) by 0 days.

(21) Appl. No.: 13/577,203

(22) PCT Filed: Feb. 17, 2010

(86) PCT No.: PCT/IT2010/000057
§ 371 (c)(1),
(2), (4) Date: Aug. 3, 2012

(87) PCT Pub. No.: WO2011/101878
PCT Pub. Date: Aug. 25, 2011

(65) Prior Publication Data
US 2012/0304972 A1 Dec. 6, 2012

(51) Int. Cl.
F02B 33/44 (2006.01)

(52) U.S. Cl.
USPC ............... 123/65 B; 123/65 R; 123/65 V

(58) Field of Classification Search
USPC .. 123/65 B, 65 V, 70 R, 65 A, 65 PD, 65 VS, 123/74 AE, 74 R
See application file for complete search history.

(56) References Cited

U.S. PATENT DOCUMENTS

| | | | | |
|---|---|---|---|---|
| 2,542,707 A * | 2/1951 | Ricardo et al. | ............... | 123/27 R |
| 2,609,802 A * | 9/1952 | Elwert et al. | ............... | 123/72 |
| 4,899,698 A * | 2/1990 | Thery | ............... | 123/65 A |
| 5,088,285 A * | 2/1992 | Stevenson | ............... | 60/605.1 |
| 5,163,388 A * | 11/1992 | Jonsson | ............... | 123/65 BA |
| 5,299,537 A * | 4/1994 | Thompson | ............... | 123/72 |
| 5,771,849 A * | 6/1998 | Hamy | ............... | 123/73 R |
| 5,791,303 A | 8/1998 | Skripov | | |
| 6,095,103 A * | 8/2000 | Ishibashi et al. | ............... | 123/65 PE |
| 6,216,649 B1 * | 4/2001 | Laydera-Collins | ............... | 123/70 R |
| 6,230,672 B1 * | 5/2001 | Ishibashi et al. | ............... | 123/65 P |
| 6,263,841 B1 * | 7/2001 | Beveridge | ............... | 123/73 R |
| 6,352,057 B1 * | 3/2002 | Drecq | ............... | 123/66 |
| 6,748,909 B2 * | 6/2004 | Drecq | ............... | 123/66 |
| 7,428,886 B1 * | 9/2008 | Minculescu | ............... | 123/71 R |
| 2006/0124086 A1 * | 6/2006 | Fabrega | ............... | 123/73 PP |

FOREIGN PATENT DOCUMENTS

EP 0764774 A2 3/1997
GB 2249585 A 5/1992

OTHER PUBLICATIONS

Baldini, Piero et al., International Search Report issued in parent International Patent Application PCT/IT2010/000057 Aug. 12, 2010.

* cited by examiner

*Primary Examiner* — Noah Kamen
*Assistant Examiner* — Grant Moubry
(74) *Attorney, Agent, or Firm* — David A. Farah; Sheldon Mak & Anderson PC

(57) ABSTRACT

Two-stroke engine (10) including an engine cylinder (18), a piston (20) sliding in the engine cylinder (18), an air pump (9), a main pipe (32) connected to the air pump (9) that communicates with the engine cylinder (18) through a plurality of scavenging pipes (28) opening into the cylinder immediately above the piston (20) in its bottom dead center position, an exhaust pipe also opening into the cylinder (18) immediately above the piston (20) in its bottom dead center position, an auxiliary pipe (29) branching from the main pipe (32) and opening into the cylinder (18) at a level higher than the scavenging pipes (28) and exhaust pipes (33), and a valve (30) capable of selectively opening and closing the auxiliary pipe (29) and configured to supercharge and decompress the cylinder (18) during the engine start-up phase.

10 Claims, 6 Drawing Sheets

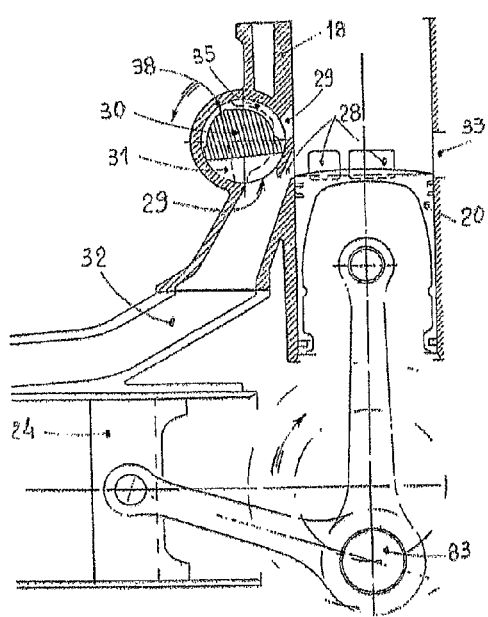
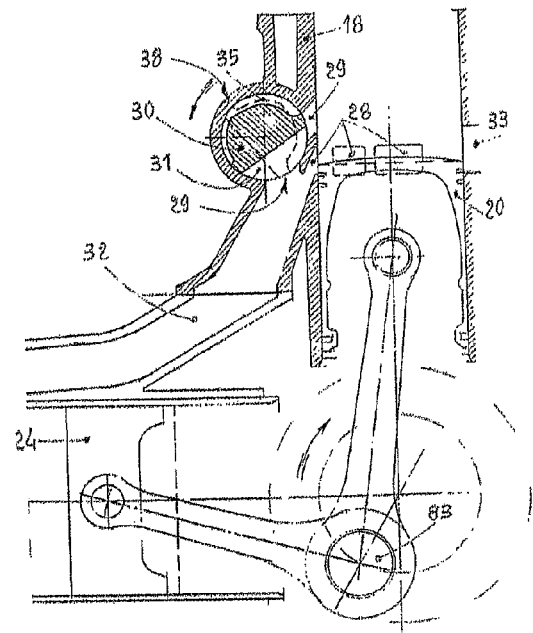
Fig. 2
Fig. 3
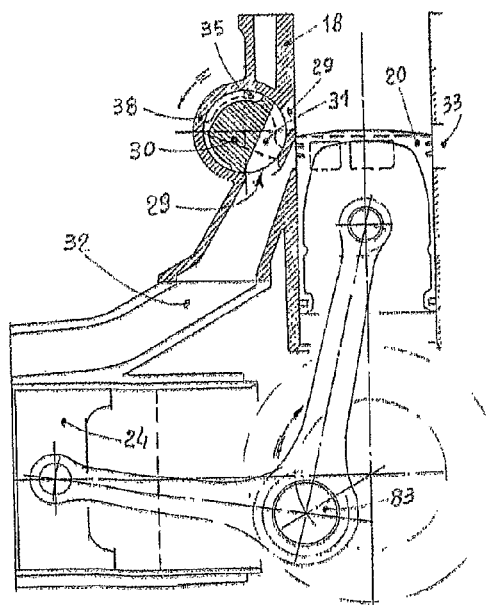
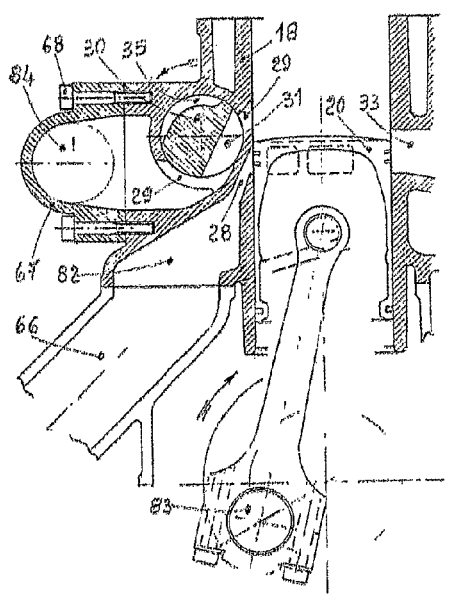
Fig. 4
Fig. 4A

TWO-STROKE ENGINE WITH LOW CONSUMPTION AND LOW EMISSIONS

CROSS-REFERENCE TO RELATED APPLICATION

The present application is a national stage of International Patent Application No. PCT/IT2010/000057, titled "Two-Stroke Engine With Low Consumption and Low Emissions," filed Feb. 17, 2010, the contents of which are incorporated in this disclosure by reference in their entirety.

TECHNICAL FIELD

The present invention refers to a two-stroke engine, especially for automotive use.

BACKGROUND ART

As already known, the use of a two-stroke engine was mainly limited to motorcycle use, this was above all due to the reduced number of components and consequent simple structure.

Other positive aspects of a two-stroke engine, compared to a four-stroke, are the elevated power produced with the same displacement and a more regular torque thanks to the availability of a power stroke for each revolution of the drive shaft.

In the automotive field, negative aspects have however prevailed over these advantages: greater consumption compared to the four-stroke, emission of pollutants, the need for more frequent maintenance.

Consumption and emissions, in particular, are subject to increasingly stringent regulations and greater attention from the public.

All manufacturers are committed to improving the performance of four-stroke engines essentially on two fronts: on the one hand by trying to make the best use of fuel in the combustion chamber (hence small engines with small combustion chambers for maximum efficiency, direct injection and supercharging), and on the other improving mechanical efficiency by reducing friction and reducing surge losses, by using effective but costly devices that change the phase and the valve lift; it is worth remembering that in a normal four-stroke engine the mechanical losses under maximum power reach approximately 20% of the engine's maximum power.

In an engine designed for city traffic, and therefore mainly used at medium-low speed, and with MEP values around 20-30% of the maximum MEP, friction and surge losses seriously affect consumption.

A two-stroke engine at 30% of the MEP has half of the friction and one third of the surge losses of a four-stroke engine; at 100% of the MEP the friction losses for the two-stroke will remain under approximately 20%.

When analyzing the typical operating range of cars with small engines in city traffic, the specific consumption indicated for a two-stroke engine fueled by direct gasoline injection is about 30% lower than a four-stroke with the same performance.

At this point it appears logical to pose the problem of whether a new concept two-stroke engine is a valid alternative to a four-stroke in the field of light transportation, and particularly within a predominantly urban environment.

DISCLOSURE OF INVENTION

The purpose of this invention is to provide an improved two-stroke engine which eliminates the disadvantages associated with traditional two-stroke engines, but exploits the positive aspects so that it can be effectively used in the automotive field.

Another purpose of this invention is to provide a two-stroke engine that is particularly suitable for electrical drive or hybrid applications.

The above mentioned purpose is achieved with a two-stroke engine, according to claim 1.

BRIEF DESCRIPTION OF THE DRAWINGS

In order to better understand this invention, a description of two preferred embodiments are provided as non-limitative examples, and with reference to the attached drawings, in which:

FIGS. 2 to 8 are schematic and partial views illustrating the positions of the main engine parts at different angles to the drive shaft throughout a cycle;

FIG. 4A is a schematic view of the main parts of the engine in FIG. 12, in a position that corresponds to that of FIG. 4, according to another embodiment.

BEST MODE FOR CARRYING OUT THE INVENTION

Figure 1:
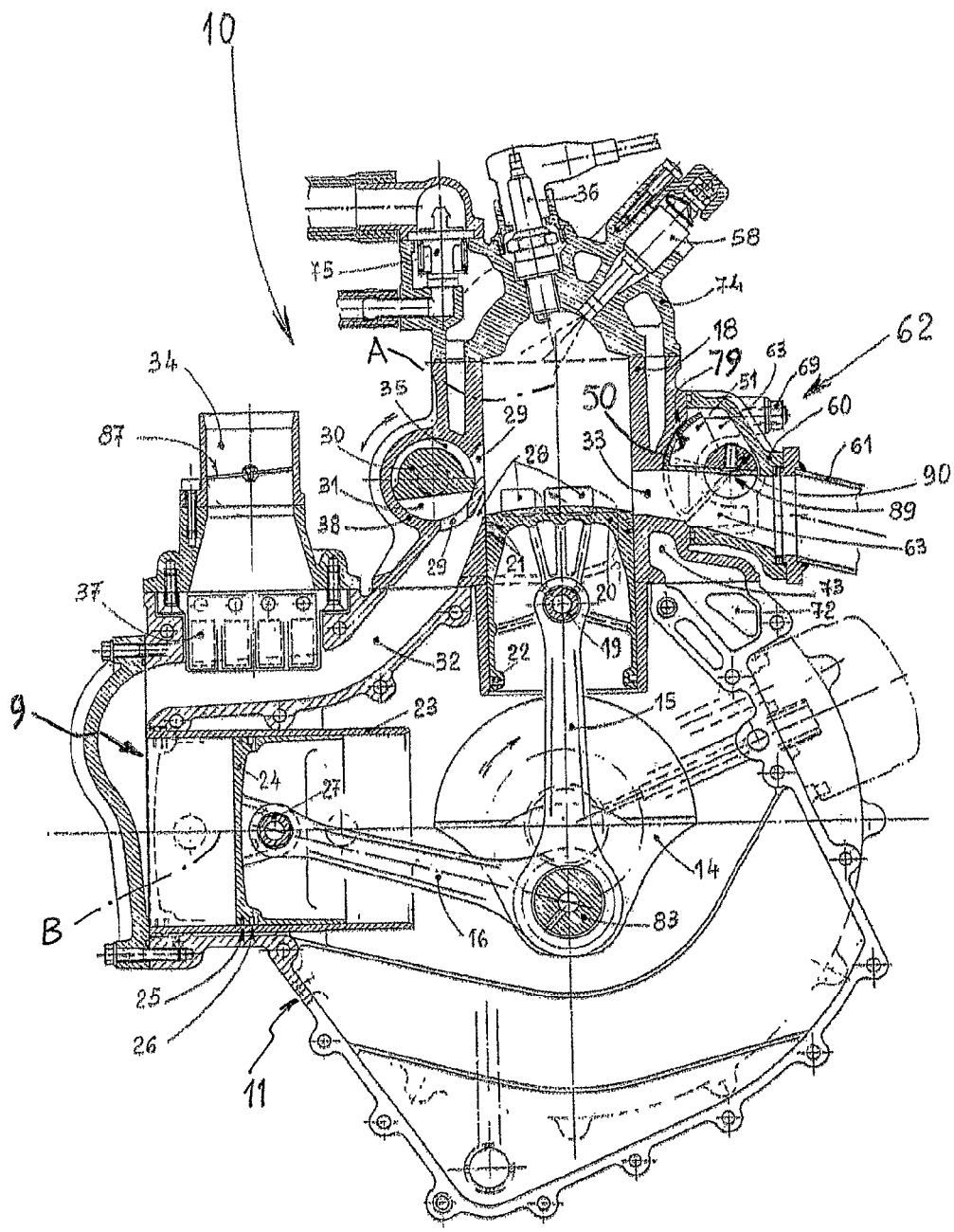
FIG. 1 is a section of a two-stroke single cylinder engine built according to this invention, based on a surface perpendicular to the axis of the crankshaft, and containing the cylinder axis.
Figure 9:
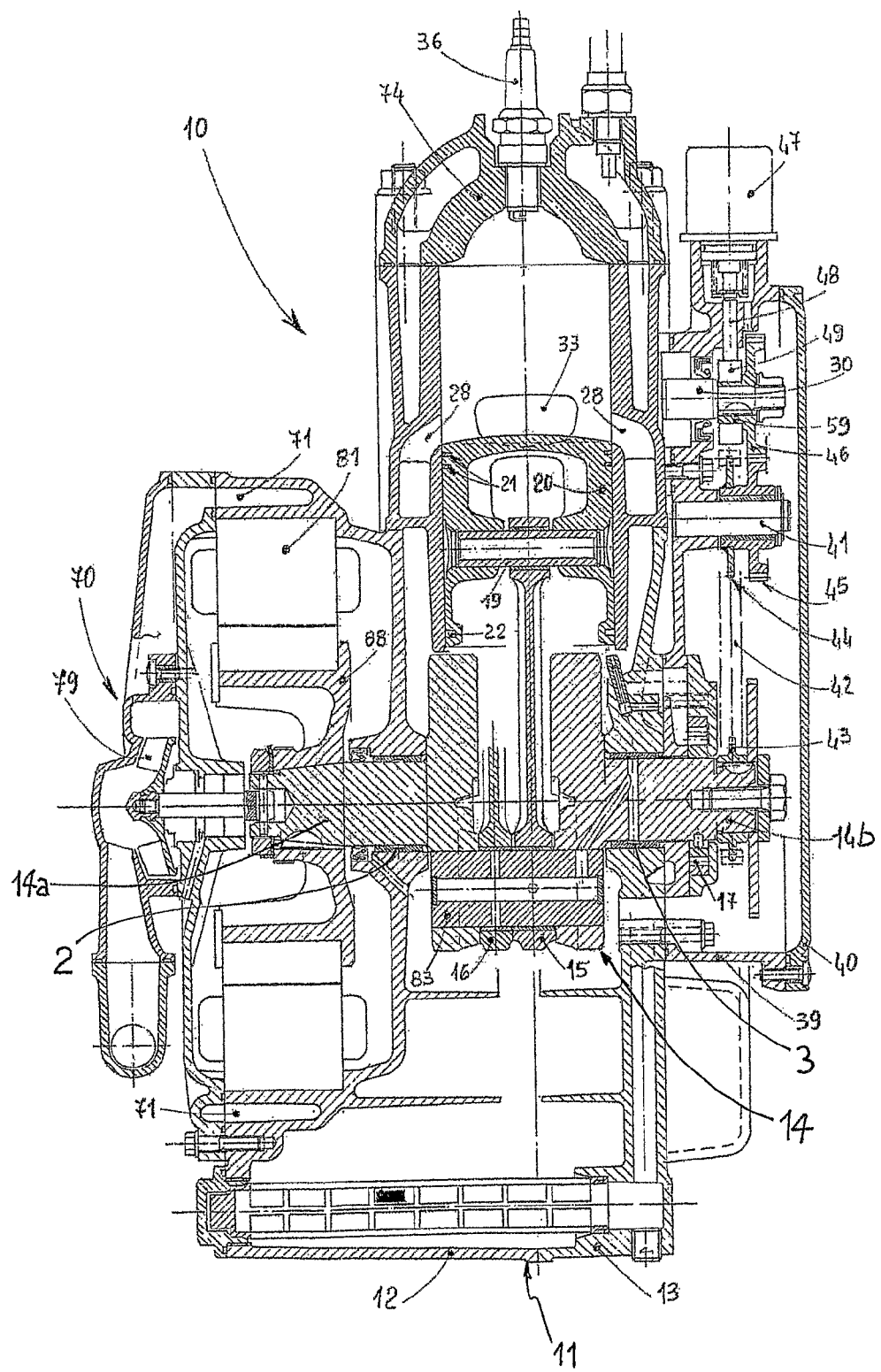
FIG. 9 is a section of the engine of FIG. 1 along a surface containing the crankshaft axis and cylinder axis.
Figure 10:
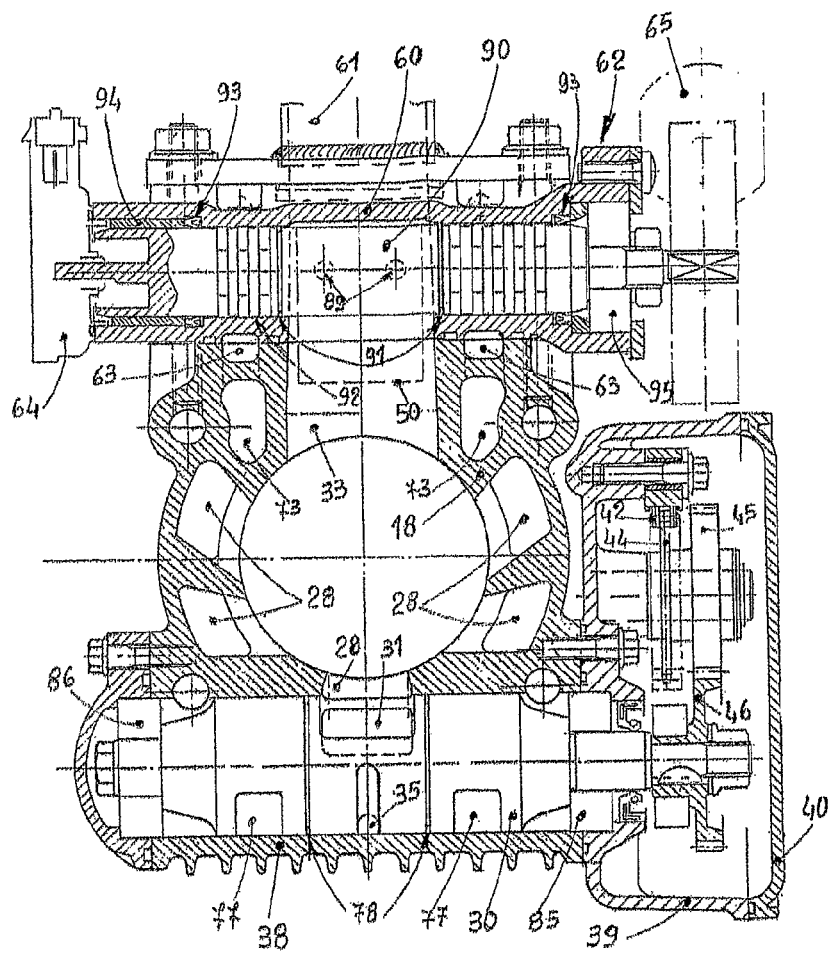
FIG. 10 is a cross-section of the engine based on a surface perpendicular to the cylinder axis.

FIGS. 1, 9 and 10 show a new concept single cylinder engine indicated as a whole with the number 10, which applies in particular, but not exclusively, to electric or hybrid vehicles.

The engine 10 includes a crankcase 11 consisting of two semi-crankcases 12, 13 and a crankshaft 14 supported by two bearings 2, 3 on the crankcase 11. The crankcase 11 defines on one side a motor cylinder 18, having an axis A, which contains a sliding engine piston 20 complete with track segments 21 and oil control ring 22, housed at the bottom of the piston. The piston 20 is hinged to a connecting rod 15 by means of a pin 19.

On another side of the crankcase 11 there is an air pump 9 that includes a pump cylinder 23, having an axis B perpendicular to the axis A, that contains a sliding pump piston 24 complete with track segments 25 and oil control ring 26. The pump piston 24 is hinged to a connecting rod 16 by means of a pin 27.

The crankshaft 14 has a crank pin 83 to which are hinged connecting rods 15, 16 via ball bearings 4, 5. For economic reasons, the crankshaft 14 is preferably built in three pieces: two half shafts 14a, 14b and the crank pin 83 that connects them (FIG. 9).

The air pump 9 placed with its axis perpendicular to that of the engine cylinder 18 has the advantage of balancing the forces of the first order: the equi-rotating component can be balanced with the counterweight of the crankshaft 14 while the counter-rotating component is opposite to that of the engine and nullifies it.

The main bearings 2, 3 of the crankshaft 14 and ball bearings 4, 5 are lubricated with pressurized oil by means of a pump 17 placed on the crankshaft 14; this choice aims at achieving low noise levels.

The pump cylinder 23 and engine cylinder 18 are connected by a main pipe 32 which communicates with an intake manifold 34 through a group of one-way valves with slats 37. The main pipe 32 communicates with the inside of the engine cylinder 18 through a plurality of transfer ports 28 which open into the respective ports placed immediately above the piston 20 in the lower dead center. The transfer ports 28, which have a substantially rectangular cross-section, are tilted upward, proceeding from the main pipe 32 towards the cylinder 18, and are distributed around the latter (FIG. 10) with the exception of the area diametrically opposite to the pipe 32, which contains the outlet port for an exhaust pipe 33. The port of the exhaust pipe 33, which also has a substantially rectangular cross-section, is set immediately above the piston positioned in the lower dead center.

The main pipe 32 is connected to the cylinder 18 by an auxiliary pipe 29 which branches off upstream from the transfer ports 28, is tilted upward and flows into the cylinder 18 at a level higher than the transfer ducts 28 and the exhaust pipe 33. The auxiliary pipe 29 serves for both supercharging and decompression.

The auxiliary pipe 29 is intersected by a cylindrical seat 38, provided tangentially in the cylinder wall 18, which houses a rotary valve 30 rotating at the same speed as the crankshaft 14, but in the opposite direction, and supported by two ball bearings 85, 86; the rotary valve 30 is cylindrical and is sealingly coupled to the seat 38 to close the pipe 29, but has a ring groove 31 configured to open the supercharging pipe 29 when aligned therewith.

The curved shape of the rotary valve 30 causes a static and dynamic imbalance that can be fully balanced by appropriate reliefs 77 made on said valve, outside the area that faces the pipe 29.

Despite the precise coupling between the rotary valve 30 and seat 38, in order to eliminate the risk of leakage from the connection, two slots can be made on the sides of the groove on the valve 31 to accommodate two piston rings 78 which statically cooperate, through an elastic preload, with the surface of the seat 38.

As already mentioned, because of its particular configuration, the valve 30 must rotate in the opposite direction to the engine. The motion transmission is located outside the crankcase 11, as shown in FIG. 9, inside a crankcase 39 and cover 40 on the side where the oil pump 17 is also housed. A chain 42 transmits the motion from a pinion 43 keyed to the crankshaft 14 to a pinion 44 idly mounted on an idle axis 41; a pair of gears 45 and 46 are used to reverse the motion, the first integral with the chain sprocket 44 the other keyed to the axis of the rotary valve 30.

This transmission, completely lubricated by the engine oil, also drives the high pressure gasoline pump 47 through a push rod 48 cooperating with a bearing 49 mounted on an eccentric seat 59 provided on the gear 46, keyed to the axis of the rotary valve 30.

FIGS. 1, 9 and 10 show a simplified version of the valve 30, designed for operating the engine 10 only in the supercharged version; therefore the exclusion of the pipe 29 is not foreseen.

This version of the engine 10 is particularly suitable for use as a motor-generator for recharging the batteries of electric vehicles ("range-extender"). In this case, the electric machine is placed on one side of the engine as shown in FIG. 9, with the rotor 88 keyed on the crankshaft 14 and stator 81 inserted into a seat of the engine's half crankcase 12.

A head 74 is mounted on the engine cylinder 18 which delimits the combustion chamber 7 and houses an injector 58 positioned to produce a direct injection in the direction substantially opposite to the scavenging flow, and a spark plug 36.

The exhaust pipe 33 intersects a cylindrical bore 50 that houses a valve 51 for controlling the useful section of the exhaust pipe. This device serves to reduce engine power, thereby facilitating the persistence of combustion gases within the cylinder, stabilizing the filling, improving the regularity of the engine under low charge, particularly when in idle, definitely reducing much of the cyclic irregularity of the engine, with advantages on emissions and consumption.

The valve 51 is integrated into an exhaust manifold group 62 applied to the cylinder 18 by means of screws 69, as clearly shown in FIGS. 1 and 10. The group 62 includes a manifold 60 with an internal cavity that extends the exhaust pipe 33 until it interfaces with the exhaust system 61, and houses the valve 51.

The valve 51 is made up of a shaped element with a cylindrical Portion surface 79, which cooperates with a seat 50 obtained on the cylinder 18. This element is blocked with screws 89 to a spindle 90 suitably shaped to facilitate heat dissipation. On both sides of the valve 51, at the beginning of the cylindrical portion of the spindle 90, there are the seats for the piston rings 91 that work preloaded in a cylindrical seat 92 of the housing, forming an effective barrier against gas leakage. At the ends of the spindle 90 there are seals 93 and support bearings 94, 95.

The manifold 60 has a wide chamber 63 for the coolant, whose large heat transfer surfaces can prevent the group from overheating. On one end of the spindle 90, there is a position sensor 64 and on the other a two-way electric motor 65 for changing the position of the valve 51.

This device is controlled electronically and, in this type of engine, it must be integrated with the position of a throttle valve 87 placed in the inlet conduit 34.

The engine 10 is liquid cooled by a centrifugal pump 70 positioned on the closing cover of the electrical machine where the impeller, driven by the crankshaft 14, is pre-assembled. The coolant is sent by the pump 70 into a cavity 71 made in the half crankcase of the engine that also holds the stator 81, for cooling the electric machine; from here it exits from a slit 72 and goes into the cylinder where it finds a channel 73 that forces the coolant to skim the outer surface of the exhaust pipe 33 and the cooling chamber 63 of the group 62 that houses the valve 51, then proceeds to the head 74 and exits the thermostat 75 to enter the radiator (not shown).

The system is also equipped with a circuit that re-circulates the liquid inside the engine during the warm-up phase when the thermostat is shut.

The operation of the engine 10 is described starting from the position in FIG. 2, where the engine piston 20 is at the lower dead center, with the transfer port and exhaust port fully open while the pump piston 24 is in full compression phase and is therefore discharging air into the engine cylinder 18 through the main pipe 32 and transfer pipe 28, carrying out a scavenging phase to expel combustion residue. The groove 31 of the rotary valve 30 prepares to open the supercharging pipe 29.

FIG. 3 shows the engine piston 20 which has started to ascend to the TDC, reducing the transfer port and exhaust port, while the rotary valve 30 quickly opens the supercharging pipe 29 and the pump piston 24, while ascending, has just exceeded its maximum speed.

FIG. 4 shows the engine piston 20 that has closed the transfer ports of the ducts 28 thus terminating the scavenging phase and is preparing to close the exhaust pipe 33 as well, while the groove 31 of the rotary valve 30 keeps the supercharging pipe 29 fully open, powered by the end-stage of the rise of the pump piston 24, and is about to start injecting fuel through the injector 58.

FIG. 5 again shows the supercharging pipe 29 opened with the pump piston 24 which has reached its TDC and the engine piston 20 that is closing the port of the supercharging pipe 29 thus terminating the filling phase of the cylinder and beginning mixing the fuel-air injected by the injector 58 against the scavenging stream. Immediately after the engine piston 20 closes the supercharging pipe 29 as well, while the piston 24 of the air pump reverses its motion and moves towards its bottom dead center, giving rise to the intake phase with the valve group with one-way strips 35 that allow the air to enter the pipe 32; meanwhile the engine piston 20 approaches the ignition point and fuel injection stops, followed by ignition and combustion.

Figure 6:
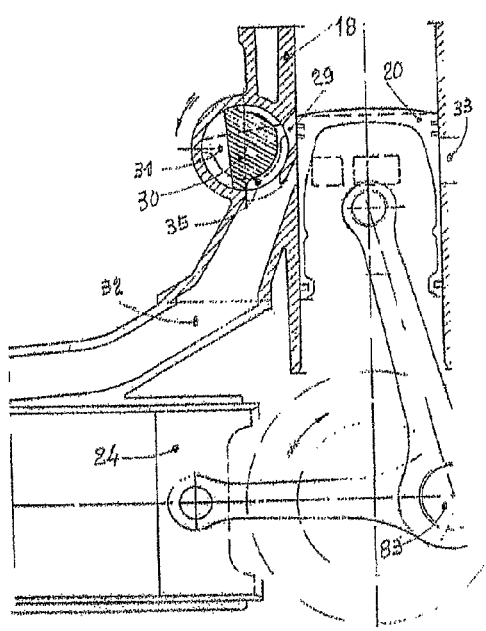

FIG. 6 shows the engine piston 20, which, descending from the TDC due to the combustion mixture previously compressed and ignited by the spark plug 36 in the combustion chamber, starts to open the slit of the supercharging pipe 29 (before discharge) which however is closed by the cylindrical surface of the rotary valve 30.

If necessary, a channel 35 can be made on the rotary valve 30, (as shown in the figure), of suitable thickness and length, which will allow part of the combusted gas to flow into the main pipe 32, before opening the slit in the exhaust pipe 33, thereby allowing a certain amount of exhaust gases to re-circulate (EGR), when necessary, while the pump piston 24 reaches its bottom dead center and completes its intake phase.

Figure 7:
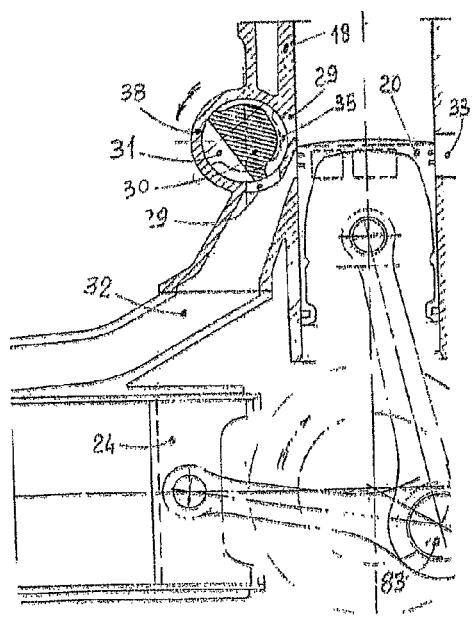
Figure 8:
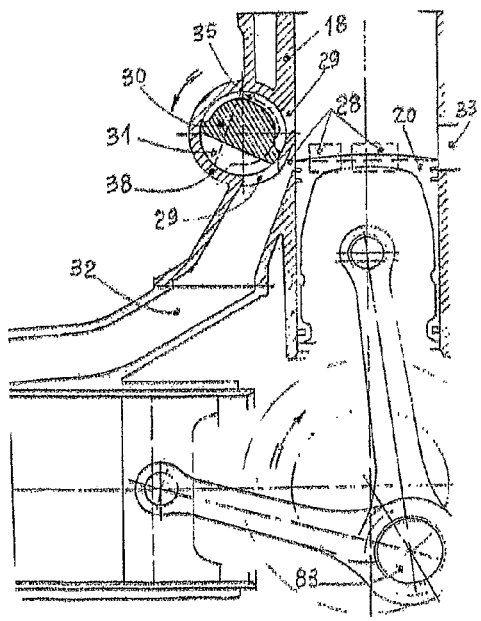

FIG. 7 shows the engine piston 20 that has begun opening the port of the exhaust pipe 33 through which exhaust gases will begin to flow out due to their pressure. At the same time the pump piston 24, which is 90° in advance with respect to the engine piston 20, has completed an initial part of its compression, sending air into the main pipe 32 and then to the cylinder through the transfer ports 28 to expel combustion residue from previous combustion, as soon as another portion of downward run will have caused the ports 28 to open, with the piston 24 of the pump in delivery phase as shown in FIG. 8.

This completes the entire cycle which is repeated at each turn of the crankshaft.

In FIGS. 2 to 8, the rotary valve 30 is always in supercharge position.

Figure 11:
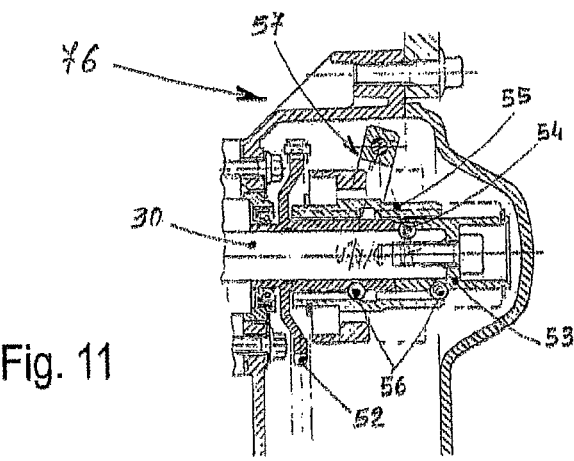
FIG. 11 is a section of the variable camshaft timing for the engine in FIG. 1, according to one embodiment of this invention.

If the engine is not required to produce maximum power, the valve 30 can be placed in a position rotated by about 90°, in the direction opposite to that of the rotation, using a phase converter 76 as shown in FIG. 11 applied to the end of the axis that moves the rotary valve.

An idle gear 52 (which replaces the gear 46 of the embodiment of FIGS. 1, 9 and 10) is mounted on the valve 30 and driven by the crankshaft 14 by means of a gear, chain or otherwise. Another element 53 is blocked at the end of the cylindrical part of the valve 30 to which it is appropriately phased by a sphere 54. The connection between the gear 52 and the element 53 is made with a short pipe 55 with internal spiral grooves that extend symmetrically, sloping oppositely from a duct in the center. The short pipe 55, which is connected at an angle to the gear 52 and element 53 by spheres 56 that are housed in suitable tracks on the gear 52 and on the element 53 integral with the valve 30, and can slide in the spiral ducts of the short pipe 55.

The short pipe 55 can be moved axially with a fork 57 governed by an electronically controlled actuator (not shown). When the short pipe 55 is axially displaced, the spheres 56 force the gear 52 and other element 53 into a different relative position, thus changing the timing.

By once again examining the schematic FIGS. 3-8, with regards to the position which the rotary valve 30 assumes under partial load conditions (indicated with dashes), it is noted that in FIG. 4, which at first showed a fully supercharged pipe 29, the pipe is closed, while in FIGS. 6 and 7, which describe the possibility of creating a channel 35 on the surface of the valve to re-circulate exhaust gases at full power, this option is still available, if needed, thereby creating continuity with a section suitable for reduced gas mode which, if needed, will certainly be less than that obtained under full power, bearing in mind that the power is reduced by choking the valve 51 present on the exhaust pipe, which is already loaded with a fair amount of exhaust gas.

In summary it can be said that with this device it is possible to separately calibrate the channel 35 which short-circuits the exhaust gases depending on the engine load.

Figure 5:
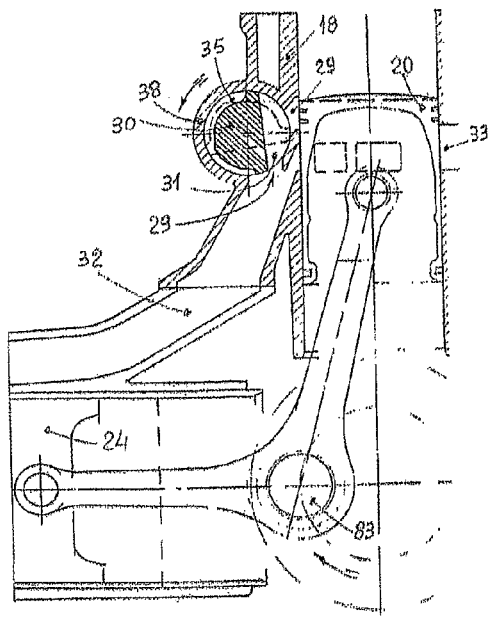

The rotary valve 30, amongst its many functions, also includes decompression to reduces the resisting torque at engine start-up, as shown in FIG. 5; it is to be considered that the efficiency of the air pump is reduced at start-up speed, therefore it is not able to compress the air through the feed pipe. With the rotary valve 30 in supercharging position, the engine piston 20 begins the compression phase not after the exhaust pipe 33 is closed, but after the port of the feed pipe 29 is closed; therefore the compression will be delayed, with a double advantage: when the lever arm given by the radius of the crank is at maximum (as in the position in FIG. 5) the pressure inside the cylinder is low and therefore there is little resistance. The pressure then increases when the engine piston 20 approaches the TDC, at which point the lever arm decreases with the result that there will be very little torque resistance.

Reducing the resistance torque upon starting is particularly advantageous in applications that require frequent engine restarting, e.g. start-stop systems.

Figure 12:
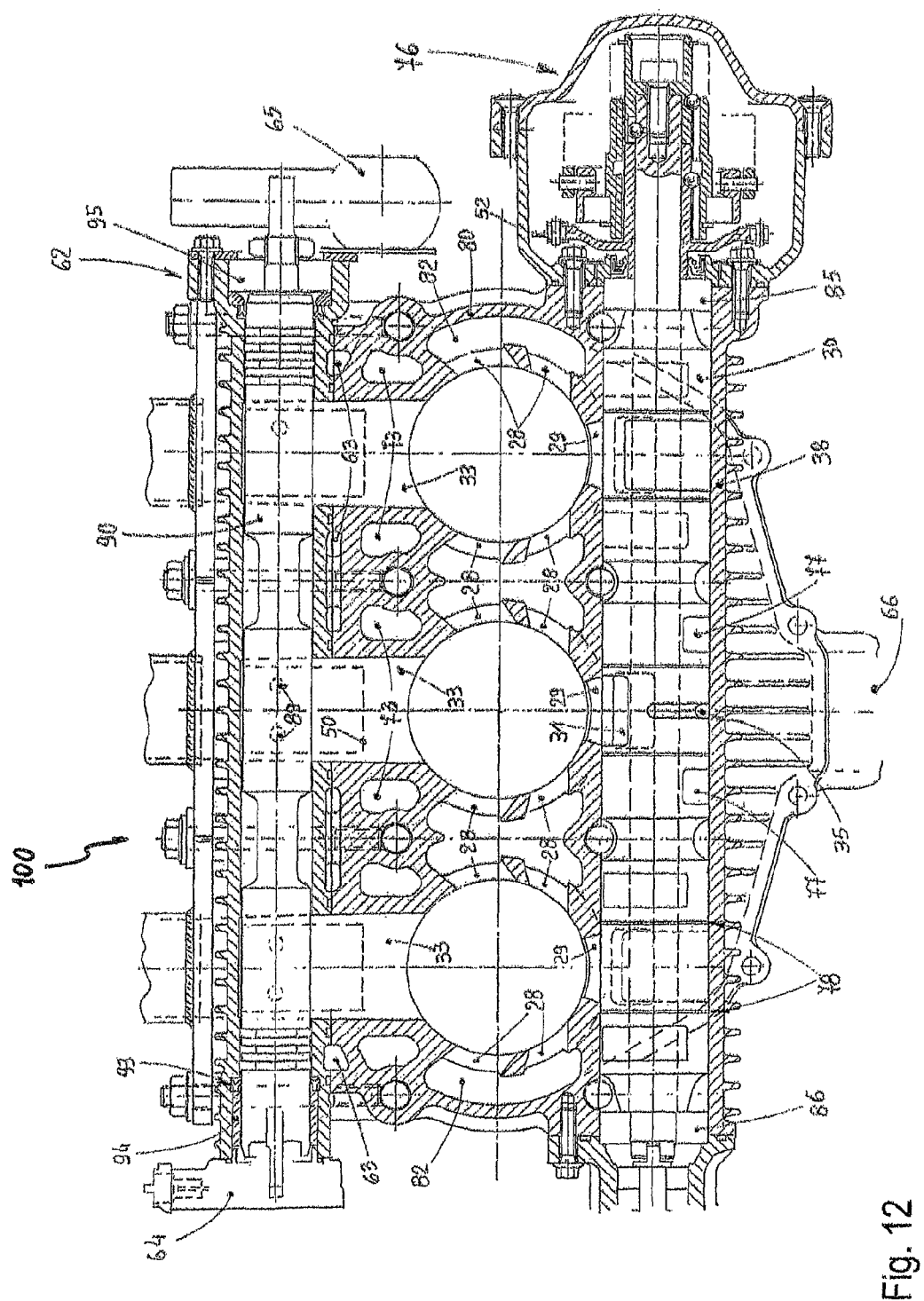
FIG. 12 is a cross-section of a three-cylinder engine according to a different embodiment of this invention.

FIG. 12 illustrates a second embodiment of this invention, consisting of a three-cylinder engine indicated in its entirety with the number 100 and particularly suitable for traction in the automotive field.

In describing FIG. 12, for reasons of convenience, the elements performing the same functions already described for the single-cylinder engine are shown with the same reference numbers.

To feed the air into the engine 100 it is preferable to use a continuous delivery pump compatible with the characteristics of the engine, instead of a piston pump as in single-cylinders because, if the cubic capacity is split, this solution is no longer advantageous both in terms of costs and size.

To reduce air flow under partial loads, an engine-pump transmission can be used with a continuous speed converter, or a simplified solution with fixed-ratio transmission and an air shutter on the pump intake, operated electronically, which replaces the function of the throttle butterfly valve. This device must be controlled in combination with the reduction of the exhaust port which is primarily responsible for handling partial loads.

The air pump, not shown, feeds the engine from an intake port 66 that communicates with a chamber 82 that branches into the transfer ports 28; the engine 100 however continues to operate in the same manner as that already described for the single-cylinder version.

FIG. 12 shows a section at the height of the transfer ports 28 and through the axis of the rotary valve 30 and the axis 90 of the throttle valves 51 of the exhaust pipes 33. Unlike the single-cylinder version, in this three-cylinder version, since both supercharged and partial gas operation is required, the rotary valve 30 is shaped to perform all the functions that this device can handle and which have already been described in the single-cylinder version. In summary, the rotary valve 30 has grooves 31 to control the respective supercharging pipes 29, grooves 77 to balance the valve 30, and channels 35 with differentiated section for handling the quantity of combustion gas recirculation under various engine operating conditions.

Even in the engine 100, as already explained for the single-cylinder, in supercharged mode, i.e. when, as shown in FIG. 4, during the ascent of the engine piston 20 the transfer ports 28 are now closed, the groove 31 holds the pipe 29 open for supercharging; this can be useful to increase filling when using alternative high octane fuels, as well as to delay compression during startup, thus reducing the work spent on this function, as explained for the single-cylinder version.

Another method for supplying air for this multi-cylinder version can be that shown in FIG. 4A, where there are two air supply lines, a main low pressure pipe 66 that feeds the transfer ports 28 through the chamber 82, and another branching or separate pipe 84, formed in a collector 67 applied to the cylinder 18 by means of screws 68 and fed at a higher pressure, that communicates with the pipe 29. The rotary valve 30, having the groove 31 described, is provided on pipe 29 to continue to feed the closed exhaust cylinder 18 through the supercharging pipe 29. This system aims at achieving higher specific power associated with excellent performance under average to low power for low pressure feeding.

It is also foreseen that a timing variator 76 will be placed at the end of the valve 30, from which motion is transmitted to the gear 52, similar to that described with reference to FIG. 11.

On this engine as well, the power is reduced mainly by choking the exhaust pipes 33, in the same manner and with the same advantages already described with regards to the single-cylinder version. In the exhaust manifold group 62 the cylindrical portion valves 51 (not shown in FIG. 12) work facing the seats 50 obtained on the cylinder block 80 and are applied to the appropriately shaped spindle 90 with seals 93 and support bearings 94 and 95 on the end. The valve unit is mounted in a collector 60 lapped by the cooling liquid, which, after being mounting on the cylinder, connects the exhaust pipe 33 to the exhaust system (not shown). At both ends of the spindle 90, there is a position sensor 64 and a two-way electric motor 65 for changing the position of the throttle valve 51.

When examining the characteristics of the engines 10 and 100 built according to this invention, the advantages afforded are evident.

Firstly, with the multifunction valve 30 it is possible to easily and effectively manage supercharging, and reduce the resisting torque upon starting by decompressing the cylinder. Preferably, the same valve is also able to handle recirculation of exhaust gases.

Additional advantages provided by these engines, built according to this invention, are as follows:
eliminate fresh mixture losses upon discharge, due to air scavenging and direct fuel injection into the cylinder with an injector mounted on the head and pointed in the opposite direction to the scavenging flow;
scavenging much more effective than in conventional two-stroke engines;
possibility of dosing the right amount of exhaust gases to be re-circulated;
elimination of lubrication oil leaks, with advantages in terms of reduced emission of pollutants, reduced carbon deposits and subsequently reduced maintenance work;
possibility of increasing the compression ratio, thus obtaining a higher average pressure for the cycle; this is possible by the evaporation of gasoline in the cylinder and by the consequential cooling of carbureted air; the advantage continues even under partial power, thanks to a small combustion chamber;
possibility of using alternative fuels.

The above benefits come with those typical of two-stroke engines, compared to four-stroke engines:
less weight and smaller overall dimensions;
less specific consumption with throttled gas;
greater torque uniformity due to the fact that the useful cycles are twice as many as those performed by a four-stroke engine during the same time interval;
reduced mechanical stress on the connecting rods, since with the same torques the average effective pressure of the cycle is half that of a four-stroke;
possibility of using high-efficiency combustion chambers due to the absence of valves.
reduced complexity and therefore easier maintenance.

Lastly, it is clear that the engines 10, 100 described can be modified or changed without departing from the scope of the claims.

The invention claimed is:

1. A two-stroke engine composed of:
a) a crankcase defining at least one engine cylinder;
b) an injector for direct injection of fuel into the engine cylinder;
c) an engine piston mobile inside the engine cylinder between a top dead center and a bottom dead center;
d) a crankshaft supported in the crankcase with at least two bearings and including at least one crank pin, at least a first connecting rod hinged to the engine piston and directly to the crank pin of the crankshaft;
e) an air pump, the air pump including a pump cylinder housed in the engine, a pump piston sliding in the pump cylinder, and a second connecting rod hinged to the same crank pin of the crankshaft as the first connecting rod;
f) a main pipe connected to the air pump communicating with the engine cylinder through a plurality of scavenging pipes opening into said cylinder through respective scavenging ports placed immediately above the piston in its bottom dead center position;
g) an exhaust pipe opening into the cylinder through an exhaust port located immediately above the piston in its bottom dead center position;
h) at least one auxiliary pipe connected to a source of pressurized air and flowing into said cylinder at a level higher than the scavenging pipes and exhaust pipes, the auxiliary pipe stemming from the main pipe;
i) a valve to selectively open and close the auxiliary pipe once in every cycle of the two-stroke engine, for supercharging during operation and for decompression to reduce a resisting torque at engine start-up, the valve being a rotary valve sealingly coupled to a cylindrical seat intersecting the auxiliary pipe and having at least one tangential groove capable of selectively aligning itself with the main pipe, the valve including a channel configured to allow exhaust gases to re-circulate from the cylinder through the auxiliary pipe, before the exhaust port is opened; and
j) a phase transformer associated with the valve and configured to turn the valve by a given angle, to exclude supercharging under partial load conditions.

2. The two-stroke engine of claim 1, wherein the air pump is the source of pressurized air.

3. The two-stroke engine of claim 1, further comprising a throttle valve to reduce the exhaust pipe under partial load conditions, the throttle valve being housed in a manifold in contact with a chamber for a coolant.

4. The two-stroke engine of claim 1, wherein the engine cylinder and the pump cylinder have respective axes arranged substantially at 90° apart.

5. The two-stroke engine of claim 4, further comprising an integrated electrical machine with a stator housed in the crankcase and a rotor connected to the crankshaft.

6. The two-stroke engine of claim 1, wherein the two-stroke engine is a multi-cylinder engine.

7. The two-stroke engine of claim 1, further comprising a chamber connected to transfer ports of each cylinder and a main pipe.

8. The two-stroke engine of claim 7, further comprising means for supplying air to the auxiliary pipes of each cylinder at a pressure higher than that of the air in the main pipe.

9. The two-stroke engine of claim 1, further comprising an oil pump for forced lubrication of the bearings and crank pin.

10. The two-stroke engine of claim 1, wherein the two-stroke engine is a single cylinder engine.

* * * * *